Oct. 27, 1953 — W. A. RAY — 2,656,821
STEAM GENERATOR
Filed June 24, 1946 — 3 Sheets-Sheet 2

Inventor
William A. Ray
By John Flam
Attorney

Oct. 27, 1953
W. A. RAY
2,656,821
STEAM GENERATOR
Filed June 24, 1946
3 Sheets-Sheet 3
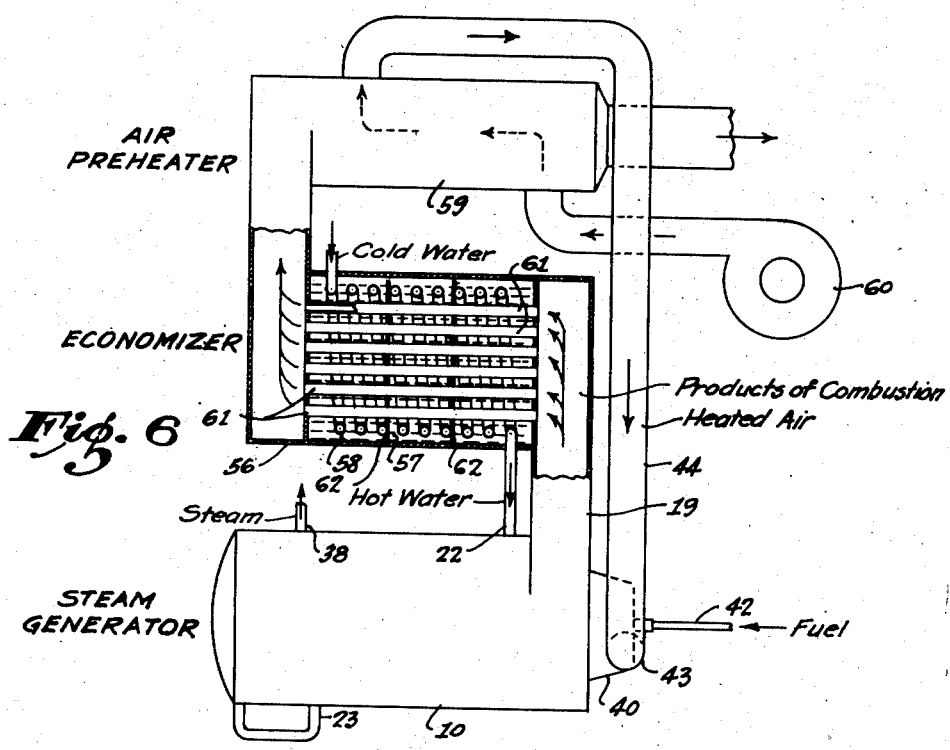
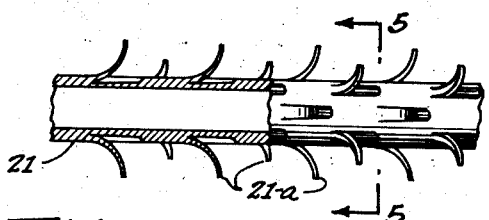
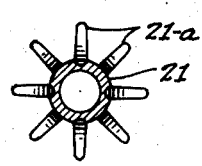
INVENTOR.
William A. Ray
BY
John Flam
ATTORNEY Patented Oct. 27, 1953

2,656,821

UNITED STATES PATENT OFFICE 2,656,821

STEAM GENERATOR

William A. Ray, North Hollywood, Calif.

Application June 24, 1946, Serial No. 678,781

4 Claims. (Cl. 122—33)

This invention relates to a system for transferring energy in the form of heat, and specifically to a boiler for generation of steam or other elastic fluid medium.

Generation of steam vapor in a boiler is usually accomplished by heating a metal surface which is in heat conducting relation to a body of water. For example, in water tube boilers, the water passes through pipes, and the exterior of the pipes are heated as by a flame. In a fire tube type, the hot gases of combustion pass through the pipes, which are immersed in the water to be heated.

The generated steam is often utilized to operate prime movers that are called upon to deliver power at varying rates. For example, if such a prime mover be used to operate an automobile, sudden overloads are often imposed for short periods. Even in industrial applications, wide fluctuations in the demand for steam may occur.

In order to take care of such variations, it is possible to provide a boiler having a capacity at least as great as that required by the maximum load. However, in the case of an automobile load, the periods of excessive load are short, of the order of a minute or so; and furthermore it is extremely important to keep the total weight of the vehicle down as much as possible.

It has been proposed in the past to use for this purpose boilers that can generate steam very rapidly, such as by using as small an amount of liquid as possible and by using high temperatures for heating the water. The difficulty with such a system resides in the fact that there is little stored heat. Accordingly, no appreciable steam pressure can be maintained after the source of heat (such as an oil burner) is inactive.

It is one of the objects of this invention to obviate these difficulties, and especially by providing a large heat reservoir which does not have a prohibitive volume, or prohibitive weight.

In order to accomplish this result, a heat reservoir is provided, formed of a body of fluid capable of retaining a high temperature for an extended period. Preferably, the fluid medium is such that its specific heat is high, and that the high temperatures are attained at low pressures. Accordingly, construction problems are simplified.

In this way, even a limited quantity of the medium operating as a reservoir can have a large heat content capable of imparting heat, as required, to the vaporized water.

It is another object of this invention to provide a steam generator, or the like, employing an intermediate liquid for transferring heat from the furnace, or other heat source, to the liquid to be vaporized.

It is another object of this invention to provide a steam generator capable of storing heat in an amount substantially in excess of that immediately usable for steam production.

It is another object of this invention to provide a steam generator adapted for operation at high pressure and capable of operating over a wide pressure and temperature variation to permit large heat storage.

It is another object of this invention to provide a steam generator having a very small amount of contained water but capable of absorbing large amounts of heat.

It is another object of this invention to provide a steam generator operating as a flash boiler, but capable of delivering power substantially in excess of its normal output for appreciable periods of time.

It is another object of this invention to provide a steam generator in which the water carrying element is arranged to be subject to a temperature having a definite limitation, whereby the generator is protected from damage by failure of the feed water supply.

It is another object of this invention to provide a steam generator capable of useful operation over a wide pressure range.

It is another object of this invention to provide a steam generator employing a supplemental liquid for transferring heat from the heat source to the water or steam, whereby the heat storage capacity of the generator is greatly increased as compared with a generator containing only water and steam.

It is another object of this invention to provide a novel form of drum type steam generator.

It is another object of this invention to provide a steam generator fabricated in a novel manner to permit the various generator parts to be joined by flanged connections.

It is another object of this invention to provide a steam generator or boiler of the Scotch type having an improved combustion chamber.

It is another object of this invention to provide a steam generator employing an intermediate heat transfer liquid, in which the thermal circulation if such liquid is controlled in a novel manner.

It is another object of this invention to provide such a steam generator having the water carrying element or tubes arranged in a novel manner to promote heat transfer from the intermediate liquid to the water.

This invention possesses many other advantages, and has other objects which may be made more clearly apparent from a consideration of one embodiment of the invention. For this purpose there is shown a form in the drawings accompanying and forming part of the present specification. The form will now be described in detail illustrating the general principles of the invention; but it is to be understood that this detailed description is not to be taken in a limiting sense, since the scope of this invention is best defined by the appended claims.

In the drawings:

Fig. 4 is a detail elevation partly in section of a fragment of one of the water tubes;

Fig. 5 is a cross section, taken as indicated by line 5—5 of Fig. 4; and

Fig. 6 is a diagram of a system incorporating the steam generator of Fig. 1, an economizer being indicated in the system.

Figure 1:
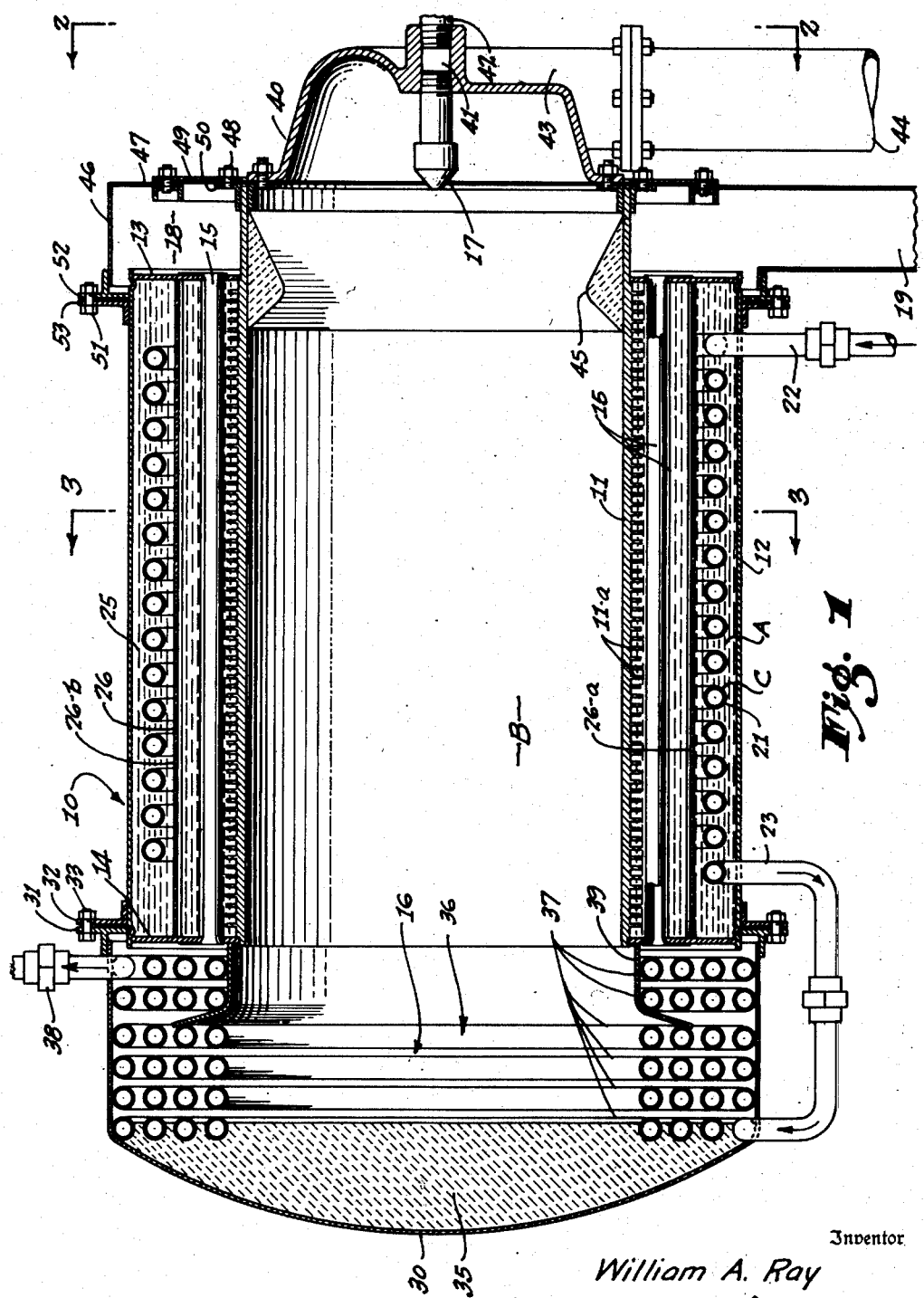
Figure 1 is a horizontal axial section through a steam generator incorporating the features of the invention, the necessary and usual heat insulation or lagging around the exposed metal parts being omitted.
Figure 3:
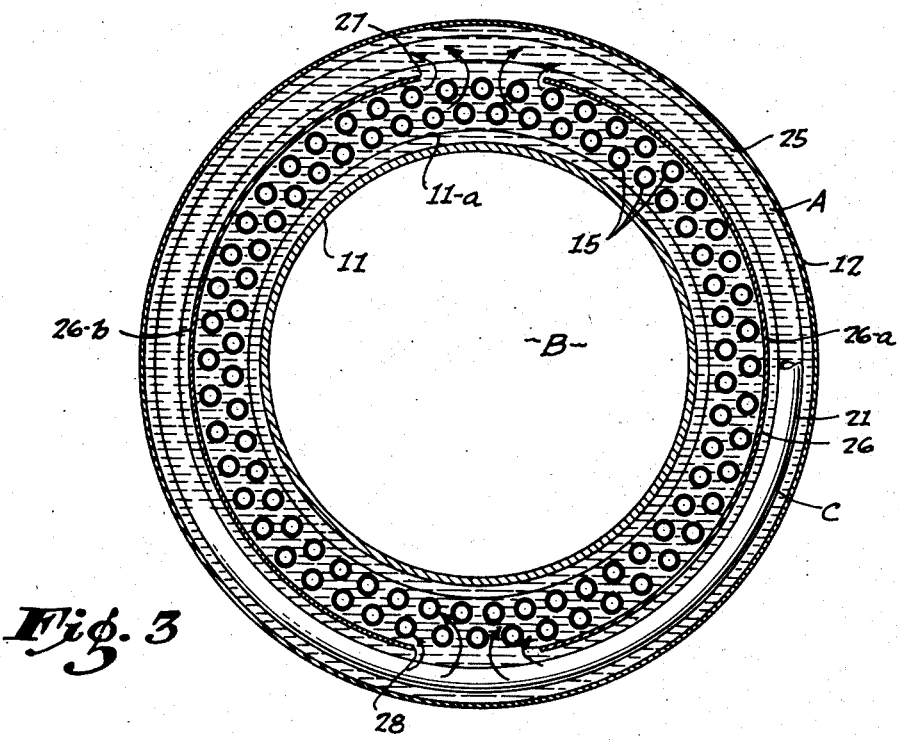
Fig. 3 is a cross section taken as indicated by line 3—3 of Fig. 1.

Referring to Figs. 1 and 3 of the drawings, the boiler or steam generator generally indicated by the numeral 10 comprises means defining a closed space A adapted to be filled with a high boiling point liquid, such as for example as an eutectic mixture of diphenyl and diphenyl oxide, known commercially as Dowtherm "A." This compound consists of 73.5% diphenyl oxide, and 26.5% of diphenyl, and is in good heat transfer relation with a source of heat, as the furnace B. The liquid such as water which is to be vaporized to operate a suitable engine and thus utilizes the heat of the furnace, is supplied to a convoluted tube C immersed in the liquid in the space A. Thus, the water in tube C is in effective heat transfer relation to the medium in space A.

A steam generator arranged in this manner has important advantages. Thus, it makes possible the use of a flash-type boiler in which the water is converted to steam almost immediately upon entering the boiler, with its attendant advantages. At the same time the ability of the boiler, by virtue of the heat transfer liquid, to absorb and store heat overcomes many of the disadvantages of a flash boiler. Thus, heat in amounts in excess of those amounts immediately usable which would otherwise be wasted or possibly injure or even destroy a conventional boiler may be absorbed and conserved by the larger thermal mass provided by a boiler of this type. Accordingly, such a boiler may be readily provided which is capable of handling a substantial overload such as 25% above the normal output of the boiler for an appreciable period of time, for example, several minutes.

Another important advantage obtained by the use of an intermediate heat transfer liquid is the prevention of damage to the boiler in the event of failure of the feed water supply. The temperature acting on the water carrying elements is of course that of the heat transfer liquid and is a direct function of the pressure on such liquid. This pressure may be limited by known means, such as safety valves and burner controls which correspondingly restrict the temperature to a safe range.

Further, such a steam generator or boiler may be constructed readily so that the steam and water passages are limited to a length of tubing, providing a limited volume, and limited cross-section, whereby very high pressures can be tolerated. The heat transfer liquid has a very high boiling point so that its pressure at temperatures corresponding to steam pressures of the order of 1000 to 1400 p. s. i. is very low, thus requiring only a simple and light container. Therefore, excess heat storage available by such high steam pressure may be obtained in an inexpensive structure and without over stressing the boiler. In this way, heat storage in an amount from 50 to 100 per cent or more for the mass of the boiler as compared with a boiler containing only water or steam, may be provided.

Referring in detail to the boiler 10 and particularly to Figs. 1 and 3, the boiler is shown as of the Scotch type, including an inner cylindrical metallic shell 11 forming the furnace B and an outer shell 12 defining with the shell 11 the annular space A for the intermediate or heat transfer medium. The opposite ends of the space or chamber A are closed respectively by heads or tube sheets 13 and 14 secured in a fluid tight manner to the shells 11 and 12. A plurality of fire tubes or flues 15 extend parallel with the furnace shell 11 between the tube sheets 13 and 14, passing through the sheets and being suitably secured therein.

A combustion chamber 16, in communication with the interior of tubes 15, is provided at one end of the furnace B for receiving the products of combustion from the heat source, which may be a conventional hydro-carbon burner including the jet 17. This jet is disposed at the other end of space B. The flues 15 open into the combustion chamber 16 and serve to transmit the heated gases therefrom to a header 18 at the jet end of the boiler, whence they are conducted away by a duct 19.

The flues 15 are closely spaced (see Fig. 3) about the furnace shell 11 to provide room within the shell 12 to accommodate the water and steam carrying tube or tubes C. As shown, the tube C comprises a single tube 21 coiled in a helical like manner within the space A between the tubes 15 and the shell 12, and extending through the shell 12 near its opposite ends to provide an inlet 22 and an outlet 23.

The fluid in the tubing C is in heat transfer relation with tubes 15 and the furnace shell 11 by means of the high boiling point liquid 25 previously discussed in the chamber A. A suitable opening having a removable closure (not shown) may be provided for substantially completely filling the chamber A and it is to be understood that known means for indicating the liquid level in the chamber as well as for controlling the pressure on said liquid are to be provided.

Since suitable heat transfer liquids, such as Dowtherm "A" are known, which are of relatively light weight, and have a low pressure such as 30–40 p. s. i. at temperatures corresponding to steam pressures of 1000–1400 p. s. i., the boiler may be constructed of light materials, since only the tube C is subjected to high pressure. Thus, while providing a simple easily made and light container for the combustion gases due to the low pressure of the intermediate heating liquid, the tubular system for the generated steam is such that very high steam pressures can be accommodated safely and readily.

To promote the transfer of heat between the furnace shell 11 and the liquid 25, as well as to avoid hot spots due to uneven heating, the furnace shell 11 is provided with spaced annular exterior ribs or flanges 11-a. Further, a baffle 26 is provided between the flues 15 and the spiral tube 21 to promote thermal movement of the liquid 25 in response to temperature differences. As shown in Fig. 1, this baffle 26 extends the entire length of the chamber A, being suitably joined to the heads 13 and 14. However, as shown in Fig. 3, the baffle 26 is discontinuous in a circumferential direction, being formed of similar halves 26-a and 26-b separated by diametrically opposite gaps or openings 27 and 28 located at the top and bottom of the generator, and extending the full length of the baffle.

The intermediate liquid 25 moves upwardly in the spaces between the baffle sections 26-a, 26-b and the furnace shell 11 in response to heat absorbed from the shell 11 and the tubes 15. The liquid 25 then unites at the top of the furnace, passes through the gap 27, divides, and passes downwardly in the spaces between the baffle sections 26-a and 26-b, and the outer shell 12 giving up heat to the water tubing C. At the bottom of the shell 12, the streams reunite, passing through the gap 28 and dividing again to pass upwardly, absorbing heat from the furnace and the tubes 15. In this way, the shortest possible circulating path is provided for the thermal head involved, as well as a path having the maximum width, in that it extends substantially the full length of the boiler. This is effective in promoting heat transfer from the furnace to the intermediate liquid and thence to the coil C, particularly where the liquid tends to have lethargic properties when circulating under a thermal head.

To promote heat transfer from the intermediate liquid 25 to the water in the coil C, the exterior of the tubing 21 of the coil is provided with means such as spines 21-a shown in Figs. 4 and 5 for increasing the area of the surface in contact with the liquid.

These spines 21-a may be formed in any convenient way as by cutting and bending outwardly, portions of the tube wall with a suitable chisel. The rate of heat transfer from the intermediate liquid 25 to the tubing 21 is low due to the sluggish movement of the liquid 25, hence the need for a large area on the liquid side. On the other hand, the small size of the tubing 21 and the high velocity of the fluid within the tubing, assures adequate heat transfer from the tubing wall to such fluid with a standard smooth bore tube.

The combustion chamber 16 is formed by a cover-like member 30 having a flange 31 by which the member is secured by a plurality of bolts 33 to a flange 32 provided on the shell 12. The member 30 serves as a closure for the end of the furnace B opposite the jet 17 and provides communication between the furnace and the fire tubes 15. The member 30 is provided with a lining 35 of refractory material upon the surface of which the burning fuel and the products of combustion from jet 17 impinge. This wall prevents damage to the member 30 by heat as well as serving, when heated, to promote proper combustion.

Additionally, a super heater 36 formed of several appropriately connected coils of pipe 37 is provided in the member 30 for raising the temperature of the steam or vapor received from the outlet 23 of the coil C. The super heated vapor is discharged through an outlet 38. To insure proper heating of the super-heater coils 37 by the products of combustion, a baffle ring 39 is provided, the coils 37 being connected in appropriate sequence.

The end of the furnace B opposite the combustion chamber 16 is closed by a cap 40 having an axial aperture 41 in which the jet 17 is supported and which supplies fuel to the jet 17 by means of a conduit 42 leading from a source of supply (not shown).

Figure 2:
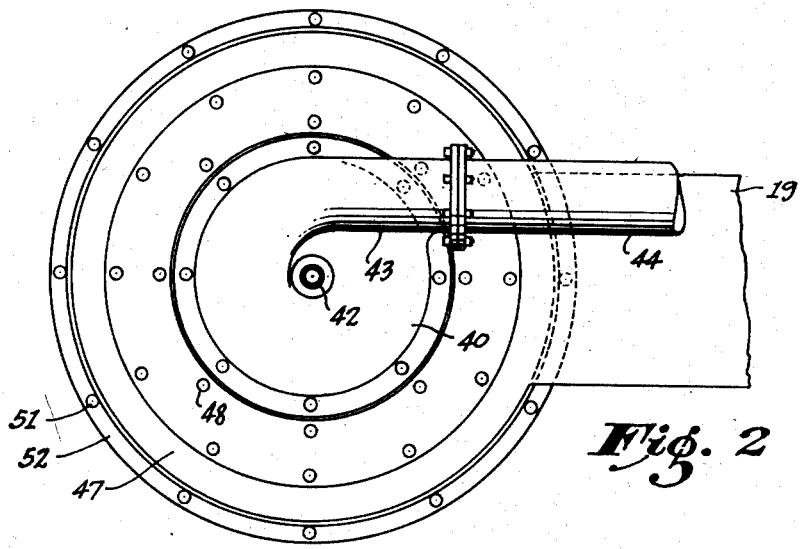
Fig. 2 is an elevation on a reduced scale as seen from the right in Fig. 1.

As shown in Fig. 2, the cap 40 is provided with an air inlet 43 connected to a suitable source of air under pressure, such as a blower, by a conduit 44. The air inlet 43 is offset radially from the jet 17 to provide a swirling motion to the combustible mixture. The furnace B may have a constriction 45 adjacent the jet 17 formed of suitable refractory material.

As shown in Fig. 1, the furnace shell 11 extends beyond the generator chamber A. An encircling wall 46 joined by a radial portion 47 with the end of the shell forms the header 18 for receiving the products of combustion from the tubes 15. The header structure is attached to the generator 10 as by bolts 48 passing through a flange 49 on the radial wall 47 and engaging an angle ring 50 secured on the shell 11, and by bolts 51 which secure a flange 52 on the radial header wall 46 to a flange 53 provided on the shell 12.

It is to be understood that the exterior surfaces of the shell 12, combustion chamber 16, and header 18 are to be covered with an appropriate heat insulating material (not shown).

As shown most clearly in Fig. 6, the steam generator 10 may have its water inlet 22 connected to the outlet of an economizer 56. This economizer is built in a manner similar to the generator 10. Thus, it has the reservoir of heat formed by a body 57 of a fluid medium, such as Dowtherm. The water pipes 58 are immersed in the liquid, in a manner similar to pipes 21 of generator 10. Heat is transferred to the medium 57 from the products of combustion passing into the interior of the economizer 56 from conduit 19 by a plurality of fire tubes 61.

To improve the heat exchange rate in the economizer 56, two or more baffle plates 62 are provided, extending perpendicularly to the fire tubes 61. These baffle plates 62 are not entirely fluid-tight, but are sufficiently so to divide the economizer into a plurality of substantially separate sections in which the fluid medium 57 is at different and progressively decreasing temperatures from right to left of the economizer 56. In this way, the products of combustion leaving the economizer will have a temperature below that of the water leaving the economizer, and not greatly above that of the incoming water.

In this way, the water is preheated to a relatively high temperature before it enters the generator 10.

As above mentioned, the baffles 62 are not fluid-tight. Thus, a single safety valve will serve to relieve excess pressure of the fluid medium 57 should such occur. Further, if the water tube 58 should break and discharge water into the high temperature fluid medium 57, the mixed fluid and water or steam can be exhausted through this valve.

The products of combustion also serve to preheat the air for supporting combustion of the fuel. For this purpose, these products are led from the outlet side of economizer 56 to a preheater 59, which may be of conventional form. Cool air is fed to the preheater through a blower 60; and the air outlet of the preheater is connected to the conduit 44 that connects to the air intake conduit 43 for the burner jet 17.

The inventor claims:

1. In a steam generator: means forming a tubular furnace adapted to contain a fluid medium; means forming a combustion chamber in free communication with one end of said furnace; a plurality of flues spaced about and extending through the fluid medium containing portion of said furnace for conducting the products of combustion from said chamber; means forming a transverse refractory surface in said chamber against which gases passing from the furnace impinge, said surface serving to direct the gases to enter said flues; and a conduit forming a separate liquid passage, said conduit having a portion of its length extending through the fluid medium containing portion of said furnace, and another portion of its length disposed in said combustion chamber.

2. In a steam generator: a double walled shell forming an annular sealed space adapted to contain a body of liquid; an end wall defining with the inner wall of said shell a fuel combustion chamber; a plurality of parallel spaced tubes extending lengthwise in the annular space, each tube communicating at one end with the combustion chamber; all of the said tube ends being open and directed toward the said end wall; means for conducting the products of combustion away from the other end of said tubes; and a multi-turn helical water tube structure immersed in the liquid and coiled around the inner wall of the shell and between the tubes and the outer wall of the shell.

3. In a steam generator: inner and outer walls defining an annular space for a fluid medium; means forming with the inner wall a combustion chamber; a plurality of spaced parallel flue tubes extending longitudinally through said space for conducting the products of combustion from said chamber; said tubes being open near one end of the combustion chamber; and a conduit forming a separate fluid passage, said conduit being coiled in a plurality of convolutions between the walls and around the inner wall; the end convolutions of the conduit being exposed in the combustion chamber.

4. In a steam generator: inner and outer walls defining an annular space for a fluid medium; means forming with the inner wall a combustion chamber; a plurality of spaced parallel flue tubes extending longitudinally through said space for conducting the products of combustion from said chamber; said tubes being open near one end of the combustion chamber; a conduit forming a separate fluid passage coiled around the tubes in the annular space; and a baffle structure dividing the annular space into an inner and an outer portion, said baffle structure providing a communication between the spaces.

WILLIAM A. RAY.

References Cited in the file of this patent

UNITED STATES PATENTS

| Number | Name | Date |
|---|---|---|
| 971,777 | Osborne | Oct. 4, 1910 |
| 1,167,158 | Emmet | Jan. 4, 1916 |
| 1,604,280 | Haag | Oct. 26, 1926 |
| 1,840,588 | Knox | Jan. 12, 1932 |
| 1,891,534 | Gray | Dec. 20, 1932 |
| 1,902,159 | Fox | Mar. 21, 1933 |
| 1,957,741 | Toreky | May 8, 1934 |
| 1,980,424 | Morgan | Nov. 13, 1934 |
| 2,055,949 | Sharp | Sept. 29, 1936 |
| 2,119,091 | Atkinson et al. | May 31, 1938 |
| 2,402,899 | Knapp | June 25, 1946 |